(12) United States Patent
Nemoto et al.

(10) Patent No.: US 7,457,064 B2
(45) Date of Patent: Nov. 25, 2008

(54) PERPENDICULAR MAGNETIC RECORDING MEDIUM, METHOD OF EVALUATING MAGNETIC PROPERTIES OF THE SAME

(75) Inventors: Hiroaki Nemoto, Kanagawa (JP); Ikuko Takekuma, Kanagawa (JP); Yuzuru Hosoe, Tokyo (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 97 days.

(21) Appl. No.: 11/715,132

(22) Filed: Mar. 6, 2007

(65) Prior Publication Data

US 2007/0217048 A1    Sep. 20, 2007

(30) Foreign Application Priority Data

Mar. 15, 2006    (JP) .............................. 2006-070462

(51) Int. Cl.
*G11B 5/667* (2006.01)
(52) U.S. Cl. .......................... 360/25; 360/135; 428/831
(58) Field of Classification Search ...................... None
See application file for complete search history.

(56) References Cited

U.S. PATENT DOCUMENTS

| | | | |
|---|---|---|---|
| 6,747,830 B2 * | 6/2004 | Yano ............................ | 360/55 |
| 6,844,605 B2 * | 1/2005 | Nishimura .................... | 257/421 |
| 7,203,607 B2 * | 4/2007 | Olson .......................... | 428/831 |
| 7,339,764 B2 * | 3/2008 | Honda et al. ................ | 360/135 |
| 2006/0146445 A1 * | 7/2006 | Nolan et al. ................. | 360/135 |
| 2006/0177703 A1 * | 8/2006 | Takenoiri et al. ............. | 428/829 |
| 2006/0269797 A1 * | 11/2006 | Lu et al. ..................... | 428/834 |

FOREIGN PATENT DOCUMENTS

| | | |
|---|---|---|
| JP | 2002-197636 | 7/2002 |
| JP | 2005-251264 | 9/2005 |

OTHER PUBLICATIONS

Oikawa et al., "High Performance CoPtCrO Single Layered Perpendicular Media with No Recording Demagnetization," *IEEE Transactions on Magnetics*, vol. 36, No. 5, pp. 2393-2395 (Sep. 2000).
Oikawa et al., "Microstructure and Magnetic Properties of CoPtCr-SiO$_2$ Perpendicular Recording Media," *IEEE Transactions on MagNETICS*, vol. 38, No. 5, pp. 1976-1978 (Sep. 2000).

* cited by examiner

*Primary Examiner*—Andrew L. Sniezek
*Assistant Examiner*—James L Habermehl
(74) *Attorney, Agent, or Firm*—Townsend and Townsend and Crew LLP; Darren Gold

(57) ABSTRACT

Embodiments in accordance with the present invention provide a perpendicular magnetic recording medium which is easy to record, offers superior thermal stability of recording magnetization, and allows high-density recording. In one embodiment, a perpendicular magnetic layer with controlled magnetic properties is used as a magnetic storage layer of a perpendicular magnetic recording medium, the magnetic properties having been controlled such that an indicator $\sigma h_{sw}$ [%] of the dispersion of magnetization switching fields in the perpendicular magnetic layer and an indicator $D_n$ [nm] of the intensity of exchange interactions, in film surface directions, in the perpendicular magnetic layer satisfy inequalities $\sigma h_{sw}/27+D_n/90<1$, and $D_n>20$. The indicators can be measured using a magnetometer.

6 Claims, 9 Drawing Sheets

Magnetization Curve A       Magnetization Curve B

Hatched Area: Positive Magnetization
White Area: Negative Magnetization (a)

| | First perpendicular magnetic layer | | Third perpendicular magnetic layer | | | | Magnetic properties | | Recording properties | |
|---|---|---|---|---|---|---|---|---|---|---|
| | Substrate bias voltage [V] | Substrate temperature (°C) | Total Thickness [nm] | Co layer Thickness [nm] | Pd layer Thickness [nm] | Process gas | $D_n$ [nm] | $\sigma h_{sw}$ | $\log_{10}$(Byte ER) | Overwrite [dB] |
| Sample disk #01 | 0 | 60 | | | | | 22 | 26.5 | -0.2 | 39 |
| Sample disk #02 | -100 | 80 | | | | | 17 | 24 | -1.1 | 25 |
| Sample disk #03 | -150 | 100 | | | | | 15 | 22 | -1.2 | 22 |
| Sample disk #04 | -250 | 140 | | | | | 13 | 20 | 0 | 15 |
| Sample disk #05 | 0 | 60 | 3.6 | 0.4 | 0.8 | Ar | 32 | 25 | 0 | 52 |
| Sample disk #06 | 0 | 60 | 6 | 0.4 | 0.8 | Ar | 41 | 25.5 | 0 | 54 |
| Sample disk #07 | 0 | 60 | 9.6 | 0.4 | 0.8 | Ar | 49 | 22 | 0 | 55 |
| Sample disk #08 | -250 | 140 | 3.6 | 0.4 | 0.8 | Ar | 29 | 20.3 | -1.4 | 53 |
| Sample disk #09 | -250 | 140 | 6 | 0.4 | 0.8 | Ar | 42 | 19 | 0 | 54 |
| Sample disk #10 | -250 | 140 | 9.6 | 0.4 | 0.8 | Ar | 50 | 16.9 | 0 | 54 |
| Sample disk #11 | 0 | 60 | 3 | 0.2 | 0.8 | Kr | 24 | 26 | -0.2 | 45 |
| Sample disk #12 | 0 | 60 | 6 | 0.2 | 0.8 | Kr | 26.5 | 24 | -0.4 | 47 |
| Sample disk #13 | 0 | 60 | 9 | 0.2 | 0.8 | Kr | 30 | 22 | -0.9 | 50 |
| Sample disk #14 | -250 | 140 | 3 | 0.2 | 0.8 | Kr | 15 | 21.2 | 0 | 17 |
| Sample disk #15 | -250 | 140 | 6 | 0.2 | 0.8 | Kr | 18 | 19.2 | -1 | 26 |
| Sample disk #16 | -250 | 140 | 9 | 0.2 | 0.8 | Kr | 19 | 18.1 | -2.1 | 34 |
| Sample disk #17 | 0 | 60 | 3.3 | 0.3 | 0.8 | Kr | 25 | 24.3 | -0.5 | 44 |
| Sample disk #18 | 0 | 60 | 6.6 | 0.3 | 0.8 | Kr | 29 | 20.6 | -2 | 46 |
| Sample disk #19 | 0 | 60 | 8.8 | 0.3 | 0.8 | Kr | 33 | 16 | -4.9 | 50 |
| Sample disk #20 | -250 | 140 | 3.3 | 0.3 | 0.8 | Kr | 16.5 | 19.8 | -1.2 | 15 |
| Sample disk #21 | -250 | 140 | 6.6 | 0.3 | 0.8 | Kr | 22 | 18.4 | -4.6 | 39 |
| Sample disk #22 | -250 | 140 | 8.8 | 0.3 | 0.8 | Kr | 25 | 15.9 | -6.4 | 43 |
| Sample disk #23 | 0 | 60 | 3.6 | 0.4 | 0.8 | Kr | 33 | 21.1 | -0.6 | 52 |
| Sample disk #24 | 0 | 60 | 6 | 0.4 | 0.8 | Kr | 41 | 16.2 | -1.6 | 51 |
| Sample disk #25 | 0 | 60 | 9.6 | 0.4 | 0.8 | Kr | 44 | 12 | -5.3 | 51 |
| Sample disk #26 | -250 | 140 | 3.6 | 0.4 | 0.8 | Kr | 29 | 16.5 | -6.4 | 47 |
| Sample disk #27 | -250 | 140 | 6 | 0.4 | 0.8 | Kr | 35 | 13.6 | -6.5 | 50 |
| Sample disk #28 | -250 | 140 | 9.6 | 0.4 | 0.8 | Kr | 37.5 | 11.6 | -6.7 | 53 |
| Sample disk #29 | 0 | 60 | 3.9 | 0.5 | 0.8 | Kr | 41 | 21.9 | 0 | 50 |
| Sample disk #30 | 0 | 60 | 6.5 | 0.5 | 0.8 | Kr | 51 | 17 | -0.6 | 50 |
| Sample disk #31 | 0 | 60 | 9.1 | 0.5 | 0.8 | Kr | 59 | 13 | -1.2 | 52 |
| Sample disk #32 | -250 | 140 | 3.9 | 0.5 | 0.8 | Kr | 37 | 16.7 | -2 | 48 |
| Sample disk #33 | -250 | 140 | 6.5 | 0.5 | 0.8 | Kr | 45 | 13 | -5.6 | 52 |
| Sample disk #34 | -250 | 140 | 9.1 | 0.5 | 0.8 | Kr | 50 | 9.6 | -6.7 | 53 |
| Sample disk #35 | 0 | 60 | 4.2 | 0.6 | 0.8 | Kr | 50 | 22.5 | 0 | 55 |
| Sample disk #36 | 0 | 60 | 7 | 0.6 | 0.8 | Kr | 61 | 17.2 | -0.2 | 54 |
| Sample disk #37 | 0 | 60 | 9.8 | 0.6 | 0.8 | Kr | 67 | 9.8 | -1 | 55 |
| Sample disk #38 | -250 | 140 | 4.2 | 0.6 | 0.8 | Kr | 41 | 17.6 | -1.4 | 55 |
| Sample disk #39 | -250 | 140 | 7 | 0.6 | 0.8 | Kr | 53 | 12.4 | -2.1 | 55 |
| Sample disk #40 | -250 | 140 | 9.8 | 0.6 | 0.8 | Kr | 57 | 8.5 | -5.1 | 55 |

PERPENDICULAR MAGNETIC RECORDING MEDIUM, METHOD OF EVALUATING MAGNETIC PROPERTIES OF THE SAME

CROSS-REFERENCE TO RELATED APPLICATION

The instant nonprovisional patent application claims priority to Japanese Patent Application 2006-070462, filed Mar. 15, 2006 and incorporated by reference in its entirety herein for all purposes.

BACKGROUND OF THE INVENTION

The magnetic storage layer of a magnetic recording medium usually has a structure in which minute magnetic particles are decoupled by nonmagnetic grain boundaries. In recent years, methods for structuring grain boundaries made of a nonmetallic material such as an oxide are being studied. Typical examples of such methods are introduced in IEEE Trans. Magn., vol. 36, p. 2393, 2000, and IEEE Trans. Magn., vol. 38, p. 1976, 2002. Such a grain boundary structure enhances independency of the magnetization direction of each magnetic particle and makes the unit of magnetization reversal in a magnetic storage layer smaller, so that it becomes possible to increase the recording density.

To further increase the recording density, besides making the unit of magnetization reversal in a magnetic storage layer smaller, it is also desirable to provide the film with thermal stability required to retain magnetically recorded information as well as to enable recording with a limited size of magnetic head field.

In the perpendicular magnetic recording method, the demagnetization fields from recorded bits do not act on the magnetic transition regions between recorded bits, and magnetized states resulting from recording are stabilized. The perpendicular magnetic recording method is therefore considered more advantageous in terms of high-density recording than the conventional longitudinal magnetic recording. Moreover, even when a thick magnetic film is used, a perpendicular magnetic recording medium, as compared with a longitudinal magnetic recording medium, can suppress deterioration of the recording and playback resolution, so that the perpendicular magnetic recording medium is considered more advantageous in terms of thermal stability. However, it has been reported that, even in a perpendicular magnetic recording medium, demagnetization fields substantially affect magnetization in areas away from the magnetic transition regions, particularly where the recording density is relatively low, causing the read output to largely decrease. Therefore, for perpendicular magnetic recording, it is also necessary to cope with thermal stability.

To improve the thermal stability of a perpendicular magnetic recording medium, it is effective to increase the magnetic anisotropy energy of magnetic particles, but doing so results in higher magnetic fields required for recording. Since the magnetic flux density that can be generated by a write head is limited, increasing the magnetic field required for recording makes it difficult to perform writing using the write head. As a result, the recording performance may deteriorate remarkably. The thermal stability can be increased also by enlarging magnetic particles of the perpendicular magnetic layer. Generally, however, when the magnetic particles are made larger, fine zigzag shapes of magnetic transition regions become larger and possibly increase medium noise.

As described above, enhancing thermal stability often deteriorates recording performance in high recording density regions.

FIG. 1 is a conceptual diagram showing a magnetization curve of the perpendicular magnetic layer of a typical perpendicular magnetic recording medium. In FIG. 1, three magnetic field parameters, i.e. magnetic saturation field $H_s$, coercivity $H_c$, and magnetic nucleation field $H_n$ are also shown as parameters representing characteristics of the magnetization curve, along with an inclination $\alpha$ at coercivity $H_c$ of the magnetization curve. To perform magnetic recording on a perpendicular magnetic layer requires a head magnetic field larger than $H_s$ to be generated. To allow magnetized information recorded on the perpendicular magnetic layer to remain stable after the magnetic field is removed, $H_n$ is required to be a positive value. Roughly speaking, therefore, when the value of $(H_s-H_n)$ of a magnetic recording medium is smaller, that is, when the inclination $\alpha$ at around the coercivity $H_c$ of the magnetization curve is larger, it is easier to write data on the magnetic recording medium and the magnetic recording medium is less easily demagnetized.

On the other hand, there is a tendency that the recording performance of a perpendicular magnetic layer is higher when its inclination angle $\alpha$ is smaller. Instances showing such a tendency are described, for example, in JP 2002-197636 A and JP 2005-251264 A. In each of the instances, optimizing the film formation process decreased the inclination angle $\alpha$ and, as a result, the signal-to-noise ratio of the playback signal of information recorded (on the film) correspondingly improved. These results are considered to be associated with a decrease in exchange interaction taking place between magnetic particles in the recording magnetic layer. Since magnetization direction became more independent between magnetic particles and small magnetic domains became easier to form that the recording performance improved. The decrease in the inclination angle $\alpha$ means that, as a result of weakening of the exchange interaction, it became less likely for the magnetization directions to be uniform between magnetic particles. This invites an increase in the recording fields required for sufficient recording and a decrease in thermal stability of the saturation state of magnetization.

It is therefore difficult to obtain, just by decreasing the exchange interaction between magnetic particles, a perpendicular magnetic recording medium which shows superior recording performance while offering both ease of recording and thermal stability. In order to realize desired recording performance while suppressing the decrease in the inclination angle $\alpha$, one must tolerate a certain degree of exchange interaction and uniformizing the magnetization switching fields of the perpendicular magnetic layer. When the exchange interaction is excessive, however, the write/read characteristics inevitably deteriorate. Uniformizing the magnetization switching fields is also difficult to achieve.

BRIEF SUMMARY OF THE INVENTION

Embodiments in accordance with the present invention provide a perpendicular magnetic recording medium which is easy to record, offers superior thermal stability of recording magnetization, and allows high-density recording. In one embodiment, a perpendicular magnetic layer with controlled magnetic properties is used as a magnetic storage layer of a perpendicular magnetic recording medium, the magnetic properties having been controlled such that an indicator $\sigma h_{sw}$ [%] of the dispersion of magnetization switching fields in the perpendicular magnetic layer and an indicator $D_n$ [nm] of the intensity of exchange interactions, in film surface directions, in the perpendicular magnetic layer satisfy inequalities $\sigma h_{sw}/27 + D_n/90 < 1$, and $D_n > 20$. The indicators can be measured using a magnetometer.

For a more complete understanding of the present invention, reference is made to the following detailed description taken in conjunction with the accompanying drawings.

BRIEF DESCRIPTION OF THE DRAWINGS

FIG. 12 is a table of error rates and overwrite values.

DETAILED DESCRIPTION OF THE INVENTION

Figure 1:
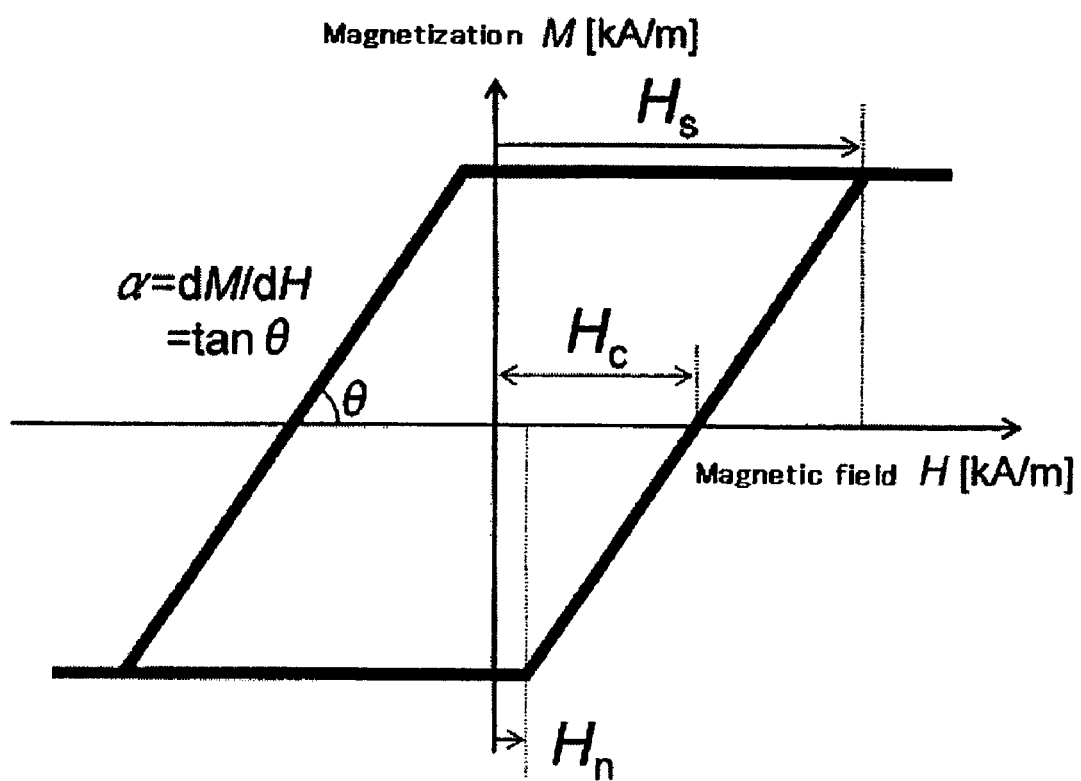
FIG. 1 is a diagram for explaining a typical magnetization curve (major loop) of a perpendicular magnetic recording medium and parameters characterizing the magnetization curve.

Embodiments in accordance with the present invention relate to a perpendicular magnetic recording medium, a method of evaluating magnetic properties of the same, and a magnetic recording apparatus.

Embodiments of the present invention relate to a perpendicular magnetic recording media, more specifically, to a perpendicular magnetic recording medium which is suitable for high-density recording and which maintains both ease of recording and thermal stability by appropriately adjusting the intensity of exchange interaction taking place in the perpendicular magnetic layer and the degree of dispersion of magnetization switching fields. Embodiments of the present invention also provide a method of quantitatively evaluating magnetic properties, such a method being indispensable for adjusting the magnetic properties.

The magnetic recording medium according to an embodiment of the present invention is one which includes a substrate and a perpendicular magnetic layer formed on the substrate. The magnetic recording medium satisfies the following equations (1) and (2) in terms of parameters $\sigma h_{sw}$ [%] and $D_n$ [nm] obtained by methods being described later. The parameter $\sigma h_{sw}$ [%] is considered to be an indicator of the magnitude of dispersion of magnetization switching fields in the perpendicular magnetic layer. The parameter $D_n$ [nm] is considered to be an indicator of the intensity of exchange interaction in the perpendicular magnetic layer.

[Eqs. 1 and 2]

$$\frac{\sigma h_{sw}}{27} + \frac{D_n}{90} < 1 \qquad (1)$$

$$D_n > 20 \qquad (2)$$

When magnetic properties of a perpendicular magnetic layer are selected such that they satisfy the equation (1), magnetic transition positions become less irregular even under a limited gradient of magnetic head field, and, as a result, a perpendicular magnetic recording medium suitable for high-density recording can be obtained. By selecting magnetic properties of the perpendicular magnetic layer such that they satisfy the equation (2), the write head field requirement can be reduced and thermal stability can be enhanced. It becomes easier to saturate magnetization under the recording process and noise in the saturated region of magnetization can be reduced.

Therefore, when the parameters satisfy both of the equations (1) and (2), it is possible to obtain a perpendicular magnetic recording medium which, while offering ease of recording and thermal stability, has recording performance required for high-density recording.

In some embodiments, a perpendicular magnetic layer is includes a magnetic layer of a cobalt-platinum-based alloy. It then becomes relatively easy to satisfy the equations (1) and (2) by adjusting the alloy composition of the magnetic layer, adding appropriate additives to the composition, and furthermore by adding more magnetic layers of different alloy compositions for combined use to the perpendicular magnetic layer.

Also, a perpendicular magnetic layer may include a granular magnetic layer having crystal grain boundaries made mainly of an oxide or a nitride. The equations (1) and (2) can be satisfied relatively easily by optimizing the method of forming the granular magnetic layer.

The perpendicular magnetic recording medium according to an embodiment of the present invention may also have a structure in which a soft-magnetic underlayer is provided between a perpendicular magnetic layer and an undercoating. The soft-magnetic underlayer makes the write magnetic field from the write head larger, so that deterioration of the recording performance attributable to inadequacy of the write magnetic field can be prevented.

Carrying out the magnetic characteristic control as described above requires a method of quantitatively evaluating the magnetic properties. In the following, a concrete method of determining the indicators $D_n$ and $\sigma h_{sw}$ will be described, and how the intensity of exchange interactions and the dispersion of magnetization switching fields can be represented by such indicators will be explained.

In accordance with embodiments of the present invention, the conditions relevant to magnetic properties shown by the equations (1) and (2) are evaluated using a VSM (Vibrating Sample Magnetometer) which is a generally used magnetometer. First, magnetization curves A and B of a perpendicular magnetic film are measured using the following procedure. The measurements of magnetization curves described in the following are based on conditions that: the samples are kept at room temperature (approximately 20° C. to approximately 25° C.); the direction of magnetic field application is perpendicular to the magnetic storage layer surface; the duration of the application of an external magnetic field H to a sample is approximately 1 second to approximately 4 seconds; and the samples are of a size appropriate for measurement by a VSM (for example, approximately 5 mm to approximately 10 mm square).

<Magnetization Curve A>

A1 Apply a magnetic field large enough to saturate magnetization of a perpendicular magnetic layer in the negative direction.

A2 Apply various magnetic fields H in the positive direction.

A3 Measure magnetization M after removing the magnetic fields H.

A4 Obtain a magnetization curve A using the measured magnetization M as a function of the H.

The magnetization curve A is what is generally called a remanence curve. The absolute value of magnetization M at H=0 is called remanent magnetization $M_r$. In the magnetization curve A, the externally applied field H that makes M=0 is coercivity $H_c$ (also called remanence coercivity $H_{cr}$).

<Magnetization Curve B>

B1 Apply a magnetic field large enough to saturate magnetization of a perpendicular magnetic layer in the positive direction.

B2 Apply a magnetic field which makes remanent magnetization $-M_r/2$ (estimatable beforehand based on the magnetization curve A) in the negative direction.

B3 Apply various magnetic fields H in the positive direction.

B4 Measure magnetization M after removing the magnetic fields H.

B5 Obtain magnetization curve B using the measured magnetization M as a function of the H.

Figure 2:
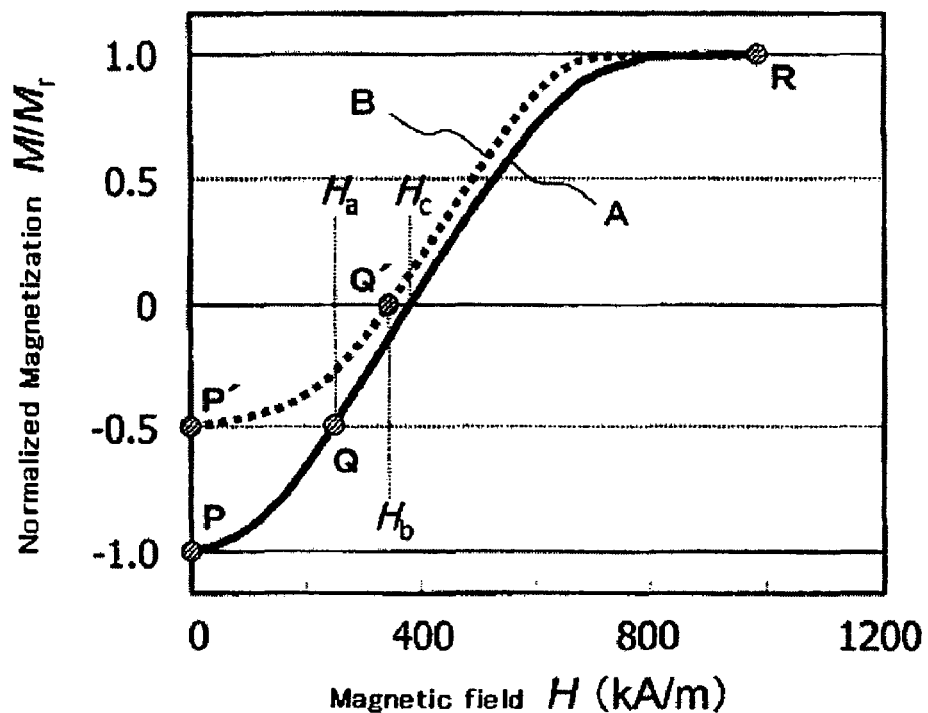
FIG. 2 is a diagram showing example magnetization curves A and B measured using a VSM by a method of measuring magnetic properties according to an embodiment of the present invention.
Figure 3:
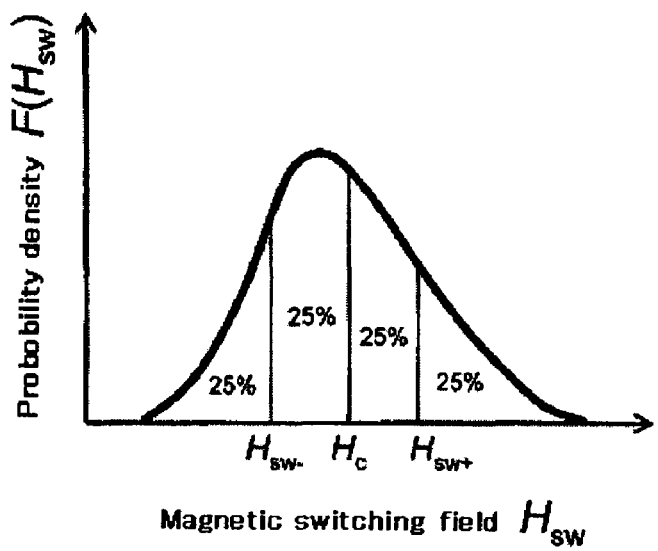
FIG. 3 is a conceptual diagram of a probability density function F ($H_{sw}$) of magnetization switching fields $H_{sw}$ in a perpendicular magnetic layer of a perpendicular magnetic recording medium.

FIG. 2 shows example magnetization curves A and B. The meaning of the magnetization curves A and B mean will be explained with reference to FIGS. 3 and 4. Generally, a perpendicular magnetic layer used as a magnetic storage layer is composed of many fine reversal units (magnetic particles). The magnetic particles each have a unique magnetization switching field $H_{sw}$. FIG. 3 is a diagram showing an example of probability density function F of reversal units $H_{sw}$ of magnetic particles. The magnetization switching field with an upper probability of $H_{sw}$ being approximately 75% is defined as $H_{sw-}$. The magnetization switching field with an upper probability of $H_{sw}$ being approximately 25% is defined as $H_{sw+}$. The magnetization switching field with an upper probability of $H_{sw}$ being approximately 50% is, by definition, the coercivity $H_c$.

FIGS. 4A to 4E are diagrams for explaining the magnetized states at different points along the magnetization curve shown in FIG. 2. In each of FIGS. 4A to 4E, the portion inside the probability density function curve is left white or hatched. The magnetization direction of magnetic particles having a reversal magnetic field $H_{sw}$ in a region indicated by each white portion is assumed to be negative. The magnetization direction of magnetic particles having a reversal magnetic field $H_{sw}$ in a region indicated by each hatched portion is assumed to be positive.

Figure 4A:
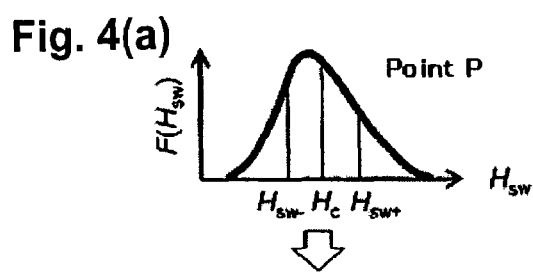
FIGS. 4A to 4E are diagrams for explaining, in terms of the method of measuring magnetic properties according to an embodiment of the present invention, states of magnetization at different points on the magnetization curves A and B, shown in FIG. 2, by using the probability density function F ($H_{sw}$) shown in FIG. 3.
Figure 4D:
Figure 4B:
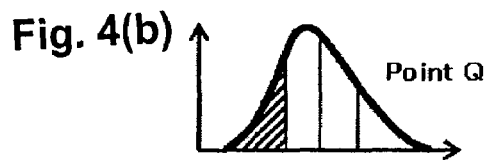
Figure 4E:
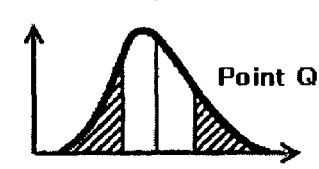
Figure 4C:
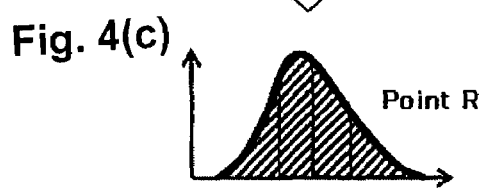

Point P of the magnetization curve A represents a state generated when, after magnetization is saturated by magnetic fields in the negative direction, the magnetic fields are removed. Therefore, as shown in FIG. 4A, the entire magnetization is oriented in the negative direction. In the following, the transition of state from point P to Q to R along the magnetization curve A will be described. At point Q, the one-fourth portion on the side where the reversal magnetic field $H_{sw}$ is smaller has turned into the positive direction as shown in FIG. 4B. At point Q, the effective magnetic field applied to the magnetic particles in the perpendicular magnetic film is considered to be $H_{sw-}$. At point R, the entire magnetization has turned into the positive direction as shown in FIG. 4C.

For the magnetization curve B, the transition of state follows points P', Q', and R in this order. At point P', steps B1 and B2 of the above procedure turn magnetization with $H_{sw}<H_{sw+}$ into the minus direction and magnetization with $H_{sw}>H_{sw+}$ into the positive direction as shown in FIG. 4D. At point Q', the one-fourth portion on the side where the reversal magnetic field $H_{sw}$ is smaller has turned into the positive direction as shown in FIG. 4E. At point Q', the effective magnetic field applied to the magnetic particles in the perpendicular magnetic film is considered to be $H_{sw-}$. As the magnetic field applied in the positive direction is gradually increased, point R is reached as in the case of the magnetization curve A.

According to the above description, the magnetic field H applied to the perpendicular magnetic layer before measurements were made at points Q and Q' should be $H_{sw-}$, that is, the same for points Q and Q'. According to the results of measurements made in the experiment, however, the magnetic fields $H_a$ at point Q and $H_b$ at point Q' shown in FIG. 2 were in a relationship of $H_a<H_b$. This inconsistency is considered attributable to the presence of a mean internal magnetic field in the perpendicular magnetic layer, causing the externally applied field H and the mean effective magnetic field $H_{int}$ to be different. Such a mean internal magnetic field is generated mainly by magnetostatic interaction between each magnetic particle and magnetic particles surrounding it. Generally, such a mean internal magnetic field varies in proportion to the average magnetization M in the perpendicular magnetic layer, and is generally referred to as a demagnetization field. In the following, the proportionality coefficient (demagnetization factor) between the demagnetization field magnitude and the average magnetization M will be denoted by $N_d$.

The demagnetization factor $N_d$ is obtained by dividing the difference ($H_a-H_b$) between the internal magnetic fields at points Q and Q' by the difference ($M_r/2$) in average magnetization M.

[Eq. 3]

$$N_d = \frac{|H_a - H_b|}{M_r/2} \tag{3}$$

The mean effective magnetic field $H_{int}$ applied to each magnetic particle is estimated, based on the externally applied field H, demagnetization factor $N_d$, and average magnetization M in the perpendicular magnetic field, as follows.

[Eq. 4]

$$H_{int}=H-N_d \cdot M \tag{4}$$

Figure 5:
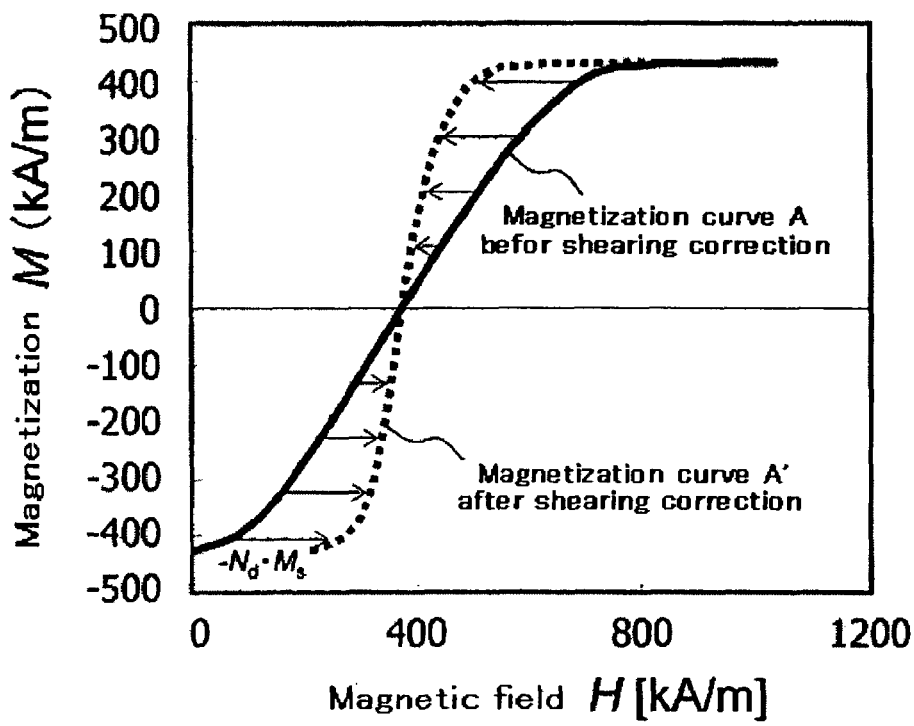
FIG. 5 is a diagram showing, in terms of the method of measuring magnetic properties according to an embodiment of the present invention, an example of shearing correction performed on the magnetization curve A.

By applying this relationship to a magnetization curve, a corrected magnetization curve taking into account the effect of demagnetization fields can be obtained. For example, when the magnetization curve A is represented by $M=M_A(H_{ext})$, expression $M=M_A'(H_{int})$ can be obtained using the relational expression of Eq. (4). This is what is generally referred to as the shearing correction (see "Soshin Chikazumi, Selection on Physics 18, Physics of Ferromagnetism, vol. 1, p 16, Shokabo, Tokyo" (in Japanese)). The method described in the "Physics of Ferromagnetism, vol. 1," however, differs from the above method in that the demagnetization factor $N_d$ is determined by calculation based on the shape of a known sample. FIG. 5 schematically shows a change in the magnetization curve A caused by the shearing correction.

In the case of a perpendicular magnetic layer of a perpendicular magnetic recording medium, when the measurement noise is appropriately corrected or smoothed, the magnetization curve A' after the shearing correction is represented by a monotonically increasing function $M_A'(H)$ for a range of $-M_r$ to $+M_r$. A cumulative probability distribution function of the reversal magnetic fields $H_{sw}$ can be obtained by appropriately standardizing the monotonically increasing function $M_A'(H)$. Namely, the probability density function F (H) shown in FIG. 3 can be obtained by the following equation.

[Eq. 5]

$$F(H) = \frac{d}{dH}\left(\frac{M_A'(H)}{2 \cdot M_r}\right) \quad (5)$$

Using this function F(H), the average value (coercivity $H_c$) and standard deviation $\sigma H_{sw}$ of the reversal magnetic fields $H_{sw}$ are defined as expressed by the equations (6) and (7), respectively.

[Eqs. 6 and 7]

$$H_c = \int_{H=H_n}^{H_s} H \cdot F(H) dH \quad (6)$$

$$\sigma H_{sw} = \sqrt{\left[\int_{H=H_n}^{H_s} H^2 \cdot F(H) dH\right] - H_c^2} \quad (7)$$

It is defined here that the lower limit $H_n$ of the integration range $[H_n, H_s]$ is the magnetic field at which the magnetization curve A' after the shearing correction substantially starts rising, and the upper limit $H_s$ is the magnetic field at which the magnetization curve A' after the shearing correction is substantially saturated. As the indicator of the magnitude of dispersion of the magnetization switching fields represented in the equation (1), the ratio of the standard deviation $\sigma H_{sw}$ to the average value $H_c$ is used.

[Eq. 8]

$$\sigma h_{sw} = \sigma H_{sw}/H_c \quad (8)$$

Figure 6:
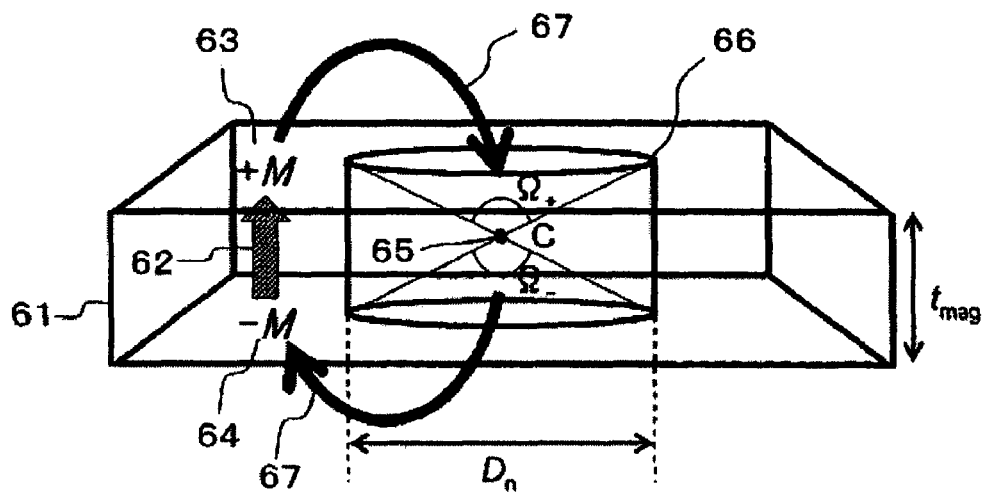
FIG. 6 is a diagram schematically showing a demagnetization field (magnetostatic interaction) acting on a magnetic particle in a perpendicular magnetic layer.

Next, the physical meaning of the demagnetization factor $N_d$ obtained using the foregoing procedure will be described with reference to FIG. 6. When a perpendicular magnetic layer 61 extending virtually infinitely relative to the perpendicular magnetic layer thickness $t_{mag}$ has magnetization M62 only outside the circular region 66 about a magnetic particle with the circular region 66 having a diameter $D_n$, the demagnetization field that the magnetization applies to the magnetic particle can be approximated by the magnetic field generated at the center (point C) of the circular region with a diameter $D_n$. The magnetic field at point C is perpendicular to the perpendicular magnetic layer 61. Its magnetic field strength can be calculated by the following equation.

[Eq. 9]

$$H = -\frac{(1-\Omega_+)}{4\pi}M + \frac{(1-\Omega_-)}{4\pi}(-M) \quad (9)$$

In the above equation, $\Omega_+$ and $\Omega_-$ represent the solid angles formed at point C when viewing therefrom the positive and negative circular regions (portions with no magnetic pole generated), respectively. $\Omega_+$ equals $\Omega_-$. $\Omega_+$ and $\Omega_-$ are given by the following equation.

[Eq. 10]

$$\Omega_+ = \Omega_- = \int_0^{2\pi} d\theta \int_0^{\phi_0} d\varphi \sin\varphi \quad (10)$$
$$= 2\pi\cos\phi_0$$
$$= 2\pi\left(1 - \frac{t_{mag}}{\sqrt{t_{mag}^2 + D_n^2}}\right)$$

The equation (10) is assigned to the equation (9) to obtain the equation (11).

[Eq. 11]

$$H = -\frac{t_{mag}}{\sqrt{t_{mag}^2 + D_n^2}}M \quad (11)$$

From the equation (11), it is known that a demagnetization field 67 acting on the magnetic particle at the center of the circular region 66 is proportional to the magnetization M. The demagnetization factor $N_d$ is expressed by the following equation.

[Eq. 12]

$$N_d = \frac{t_{mag}}{\sqrt{t_{mag}^2 + D_n^2}} \quad (12)$$

Solving the equation (12) for $D_n$ yields the equation (13).

[Eq. 13]

$$D_n = \frac{t_{mag}\sqrt{1-N_d^2}}{N_d} \quad (13)$$

The perpendicular magnetic layer used in a perpendicular magnetic recording medium is a thin-film magnetic body extending virtually infinitely relative to the film thickness and containing dense magnetic particles. A demagnetization field attributable to magnetic particles outside the circular region, with a diameter $D_n$, about a magnetic particle exists, without fail, for every magnetic particle in the perpendicular magnetic layer. Therefore, the value of $D_n$ calculated by the equation (13) based on the experimentally obtained demagnetization factor $N_d$ can be considered to be an average inner diameter of the regions where magnetic particles interact with the magnetic particle at the center of the circle in the perpendicular magnetic layer only via magnetostatic interactions (without interacting via exchange interactions). Of course, the diameter $D_n$ calculated by the equation (13) is larger than the average diameter of physical magnetic particles divided by crystal grain boundaries.

The interactions between the central magnetic particle and the magnetic particles inside the circular region, with a diameter $D_n$, about the central magnetic particle sum into zero, regardless of the average magnetization M of the perpendicular magnetic layer. The sum of the interactions does not act as a mean field proportional to the average magnetization M as represented in the equation (11). Between adjacent magnetic particles, a magnetostatic interaction and an exchange interaction take place. The magnetostatic interaction works to make the magnetization directions of the adjacent magnetic particles opposite to each other and the exchange interaction works to make the magnetization directions of the adjacent magnetic particles identical. The two interactions cancel out each other to produce no overall effect on average.

Due to local structural variations around individual magnetic particles in a perpendicular magnetic layer, however, some magnetic particles are affected more by magnetostatic interactions and others are affected more by exchange interactions, resulting in interaction fields distributed in a certain manner. The local structural variations may include differences in diameter and shape between magnetic particles and uneven exchange interaction intensity and uneven magnetostatic interaction intensity acting on individual magnetic particles. The $\sigma H_{sw}$ obtained from the equation (7) can be interpreted as representing the spread of the distributed interaction fields.

The method of evaluation according to an embodiment of the present invention uses a VSM which is a magnetometer in general use. The method is characterized in that it can extract universal magnetic properties of a magnetic storage layer. The method makes it possible, whenever VSM is used, to compare magnetic properties of magnetic storage layers on an equal basis. When comparing the recording performance of recording media using magnetic heads, the results of checking may even be reversed depending on the characteristics of the magnetic heads to be used and conditions under which write/read tests are made, so that making a fair comparison is difficult.

Designing a perpendicular magnetic recording medium which satisfies the magnetic properties described in the present invention makes it possible to realize a high medium SNR (signal-to-noise ratio) and obtain superior recording characteristics even with recording means which uses a magnetic head capable of generating only a relatively small write magnetic field, while securing the thermal stability of information magnetized on a perpendicular magnetic layer of the medium. To perform high-density recording, it is necessary to increase gradients of magnetic head field, for example, by miniaturizing the magnetic poles of the magnetic head. Such a measure reduces the maximum magnetic field generated from the magnetic head. When the perpendicular magnetic recording medium according to an embodiment of the present invention is used, however, it is possible to write information at a high medium SNR using a magnetic head suitable for high-density recording. This enables further raising the recoding density for magnetic recording apparatuses.

Effects and advantages of embodiments in accordance with the present invention will be described below based on an exemplary embodiment and with reference to drawings. The exemplary embodiment is described to clarify general principles of the present invention, and it does not limit the scope of other embodiments of the present invention in any sense.

Figure 7:
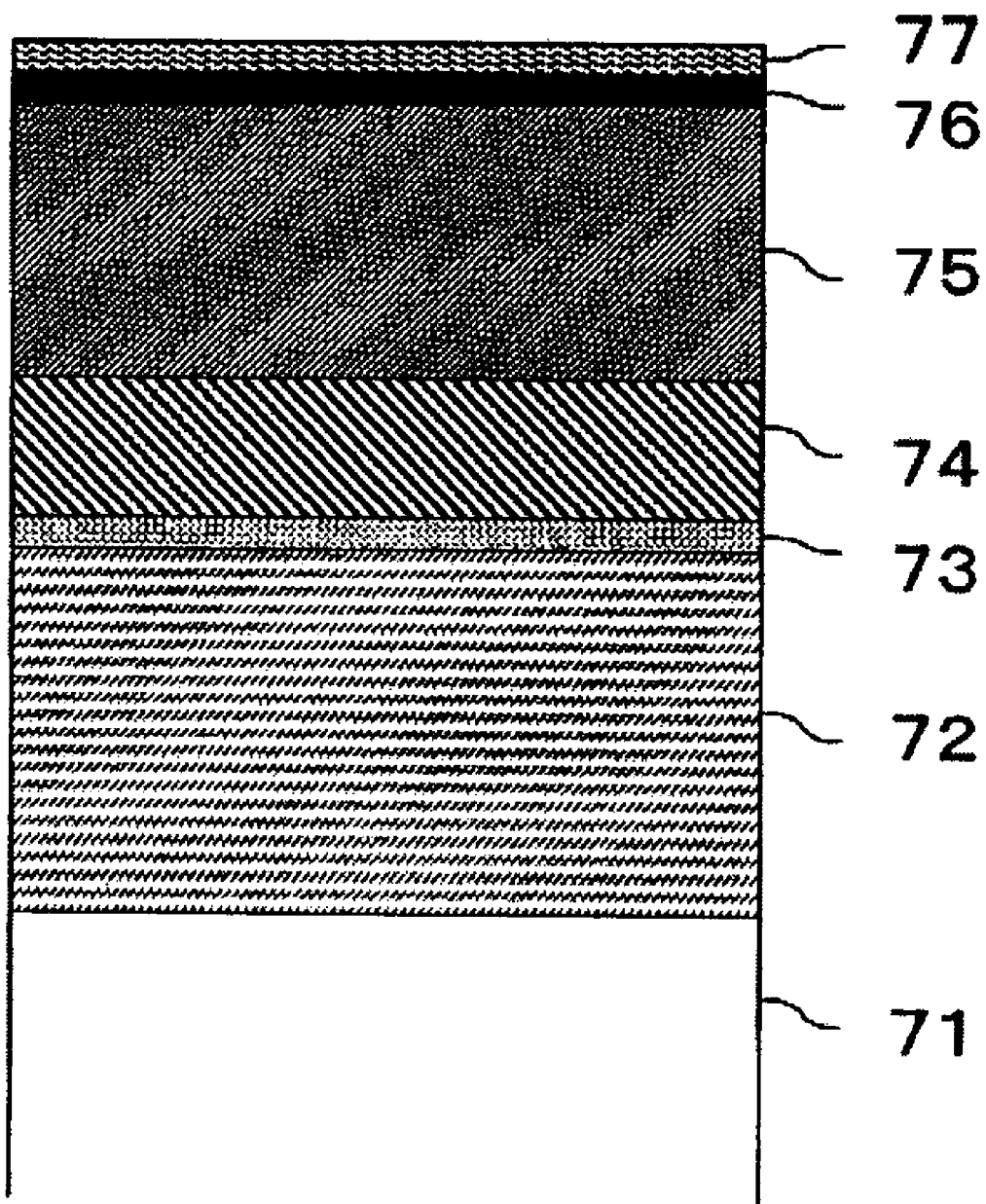
FIG. 7 is a diagram showing a typical cross-sectional structure of a perpendicular magnetic recording medium according to an embodiment of the present invention.

FIG. 7 is a schematic cross-sectional view showing a basic structure of a perpendicular magnetic recording medium according to an embodiment of the present invention. The perpendicular magnetic recording medium includes a soft-magnetic underlayer 72, a seed layer 73, an intermediate layer 74, a perpendicular magnetic layer 75, a protective layer 76, and a lubricant 77 sequentially formed on a nonmagnetic substrate 71.

Various materials having a flat, smooth surface can be used for the nonmagnetic substrate 71. For example, a NiP-plated aluminum alloy substrate or a tempered-glass substrate which are currently used as a magnetic recording medium can be used. A plastic substrate made of a resin such as polycarbonate currently used as an optical disc medium can also be used. Plastic substrates pose some restrictions. Namely, they are low in strength and easily deformed by high temperature.

The soft-magnetic underlayer 72 can be made of such alloys as FeTaC and FeSiAl (Sendust) alloys which have a microcrystal structure, or CoNbZr and CoTaZr alloys which are Co alloys having an amorphous structure. The soft-magnetic underlayer 72 is to absorb magnetic leakage flux from a write head and thereby raise the magnetic flux density penetrating the perpendicular magnetic layer 75. The saturation flux density and film thickness of the soft magnetic alloy to be used for the soft-magnetic underlayer 72 have to be designed so as to allow the soft-magnetic underlayer 72 to perform the above function. The optimum thickness of the soft magnetic alloy film, though dependent on the structure and characteristics of the magnetic head to be used, is said to be approximately 20 nm to approximately 200 nm with productivity taken into consideration. In cases where the magnetic flux from the write head can be held at a required density, the soft-magnetic underlayer 72 may be omitted. It is also possible to make the soft-magnetic underlayer 72 a multi-layered structure. Known multi-layered structures in this regard include one composed of two soft magnetic layers with an Ru layer sandwiched between them thereby realizing antiferromagnetic coupling, and another one composed of a soft magnetic layer provided, on its underside, with an antiferromagnetic material such as an MnIr alloy. The former suppresses read noise attributable to magnetic leakage flux from the soft-magnetic underlayer 72. The latter fixes the magnetization direction of the soft magnetic layer except when being subjected to recording.

The material to be used for the intermediate layer 74 is selected by taking into consideration the material to make up the perpendicular magnetic layer 75 so as to control the crystallinity and fine structure of the perpendicular magnetic layer 75 to be formed over the intermediate layer 74. When a perpendicular magnetic film made of a CoPt-based alloy or Co/Pd superlattice is selected as the material to make up the perpendicular magnetic layer 75, a metal or an alloy having a face centered cubic lattice (fcc) structure or a hexagonal closest packed (hcp) structure is often used as the material of the intermediate layer 74 so as to make the easy magnetization direction perpendicular to the film surface. It is known that, when a CoCrPt—$SiO_2$ granular magnetic layer is used as the perpendicular magnetic layer 75, superior write/read characteristics can be relatively easily obtained by using a Ru layer as the intermediate layer 74. The seed layer 73 may be provided between the soft-magnetic underlayer 72 and the intermediate layer 74. The seed layer 73 is often effective in improving the recording performance of a medium by promoting crystal growth for the intermediate layer 74 and preventing mixing between the intermediate layer 74 and the soft-magnetic underlayer 72.

For the perpendicular magnetic layer 75, a ferromagnetic material which has a large magnetic anisotropy and whose magnetization easy axis is perpendicular to the film surface (i.e. perpendicular magnetic film) is used. The ferromagnetic materials that can be used for the perpendicular magnetic layer 75 include, but not limited to, CoPt and FePt alloys including those with such additive elements as Cr, Ni, Cu, Nb, Ta, and B; $SmCo_5$ alloys; and $[Co/Pd]_n$ multilayer. Or, the perpendicular magnetic layer 75 may include plural magnetic layers made of such ferromagnetic materials. As long as the perpendicular magnetic layer 75 as a whole can function as a perpendicular magnetic film, it is not required that every one of the magnetic layers included in the perpendicular magnetic layer 75 be a perpendicular magnetic film. There are cases in which the perpendicular magnetic layer 75 is made of a granular magnetic layer having a granular structure in which magnetic crystal grains are surrounded by nonmagnetic grain boundaries and which has been formed, for example, by adding a nonmagnetic material to a ferromagnetic material. The nonmagnetic grain boundary material may be an oxide or a nitride. Oxides and nitrides in accordance with an embodiment of the present invention may include Si, Ti, Ta, Nb, Mg, Cr, Al, Hf, and Zr.

For the protective layer 76, a hard thin film composed, for example, mainly of carbon is used. To increase lubrication in case the head and the medium come in contact, the lubricant 77 made of fluorine macromolecule oil such as PFPE (perfluoropolyether) oil is applied to the surface of the protective layer 76, for example, by the dipping or spin coating.

To manufacture the layers, other than the lubricant 77, to be laminated over the nonmagnetic substrate 71, various thin film formation techniques used to manufacture semiconductors, magnetic recording media, or optical recording media can be used. Among the well-known thin film formation techniques are the DC sputtering, RF sputtering, and the vacuum deposition. Out of such techniques; the sputtering can form a film relatively fast with a high degree of purity without being dependent on the material. With the sputtering, the fine structure and thickness of the thin film to be formed can also be controlled by adjusting sputtering conditions (such as sputtering gas pressure and discharge power). The sputtering is therefore most suitable for mass production. Particularly, when forming a granular magnetic layer, grain boundary formation can be promoted by mixing a reactive gas such as oxygen or nitrogen into the sputtering gas (reactive sputtering).

The perpendicular recording medium as described above can be used in a magnetic recording apparatus like the one described in the following.

Figure 11:
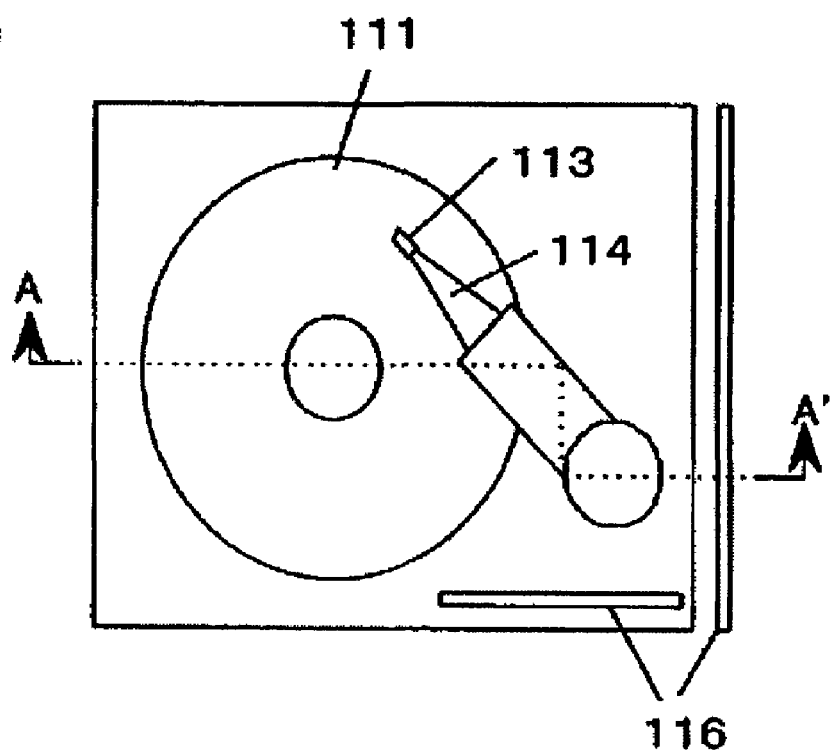
FIGS. 11A and 11B are diagrams showing the structure and components of a magnetic recording apparatus (HDD) according to an embodiment of the present invention.
Figure 11:
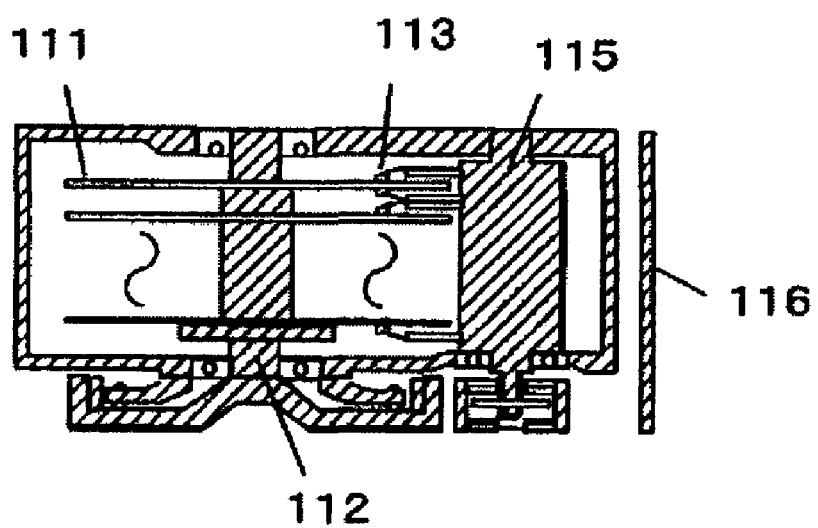

FIGS. 11A and 11B are schematic diagrams showing the structure and components of a magnetic recording apparatus according to an embodiment of the present invention, FIG. 11A being a plan view and FIG. 11B being a cross-sectional view along line A-A' in FIG. 11A.

In the magnetic recording apparatus, a perpendicular magnetic recording medium 111 according to an embodiment of the present invention is fitted on a spindle motor 112 and is rotationally driven by the spindle motor at a prescribed speed. A head slider 113 mounted with a magnetic head which accesses the magnetic recording medium 111 and performs write and read operations is attached to an end portion of a head slider suspension 114 made of metallic plate springs. The head slider suspension 114 is attached to a head actuator 115 which controls the position of the magnetic head. An electronic circuit 116 incorporated in the system controls operations of the recording medium and the write head, and processes write and read signals.

In the present experiment, a tempered glass substrate for magnetic disks is used as the nonmagnetic substrate 71. A multi-layered thin film was formed by performing DC sputtering over a washed glass substrate using an inline type sputtering machine. First, to secure thin film adhesiveness to the glass substrate, the substrate surface was coated with an approximately 30-nm thick NiTa amorphous alloy using an $Ni_{65}Ta_{35}$ target (each number in subscript represents a relative proportion in atomic percentage). Next, the soft-magnetic underlayer 72 was formed by generating, first, an approximately 50-nm thick soft magnetic amorphous film using a $CoTa_3Zr_5$ target, next, an approximately 0.7-nm thick antiferromagnetically coupled film using an Ru target, and, thirdly, an approximately 50-nm thick soft magnetic amorphous film using a $CoTa_3Zr_5$ target again. To generate these film layers, an Ar gas pressurized at approximately 1 Pa was used as the process gas. Subsequently, the seed layer 73 of a PcCr alloy with a thickness of approximately 8 nm was formed using a $PtCr_{25}$ target and an Ar gas pressurized at approximately 2 Pa, then the intermediate layer 74 of Ru with a thickness of approximately 7 nm was formed using an Ar gas pressurized at approximately 5 Pa.

The perpendicular magnetic layer 75 had a three-layer structure. The first magnetic layer is an approximately 10-nm thick granular magnetic layer generated by the sputtering using a $CoCr_{14}Pt_{17}$—$Ta_2O_5$ (approximately 2.5 mol %) composite target. In the film forming process, an argon-oxygen mixture (oxygen partial pressure: approximately 1.5%) pressurized at approximately 5 Pa was used as a process gas. When forming the film, a negative bias voltage (approximately 0 V to approximately −250 V) was applied to the substrate. Immediately before starting forming the first magnetic layer, the substrate was heated in vacuum using a heating lamp. After the substrate was heated, its temperature was measured using a radiation thermometer. The measurement ranged from approximately 60° C. to approximately 140° C. (among a plurality of the substrates). As shown in Table 1, the first magnetic layer was formed under varied conditions. High-performance recording media were obtained, in many cases, when the substrate temperature was high and the bias voltage was also high. As the second magnetic layer, an approximately 2-nm thick granular magnetic layer was formed in an approximately 5-Pa Ar gas atmosphere by the sputtering using a $CoCr_{26}$—$SiO_2$ (approximately 7 mol %) composite target. The second magnetic layer, though approximately 2-nm thick, was effective in improving the recording performance of the medium. As the third magnetic layer, a $[Co/Pd]_n$ superlattice was formed. The film thickness ranged from approximately 3 nm to approximately 9.8 nm. The Pd layer of the superlattice was made approximately 0.8-nm thick, and the Co layer thickness was varied from approximately 0.2 nm to approximately 0.6 nm. The periodic structure of the superlattice was formed by making a Co target and a Pd target each attached to an independent cathode discharge alternately. As the process gas, a Kr gas or Ar gas pressurized at approximately 2 Pa was used. Using a Kr gas when forming a superlattice by sputtering improved the recording performance of the recording medium remarkably. Lastly, the protective layer 76 with a thickness of approximately 5 nm was formed by making a carbon target discharge in an approximately 1.5 Pa Ar gas atmosphere including approximately 10% of nitrogen gas.

The table of FIG. 12 shows conditions (substrate bias, heated substrate temperature, superlattice structure and thickness, process gas used in forming superlattice) under which the perpendicular magnetic films 75 of the sample disks for use in the experiment were formed. From the sample disks, approximately 6-mm square pieces were cut out, and their magnetic properties were measured using a VSM. The magnetization curves A and B were measured using a prescribed procedure; the first parameter $\sigma h_{sw}$ was determined using the equations (3) to (8); and the second parameter $D_n$ was determined using the equations (3) and (13). The results of measurement of the magnetic properties are also shown in the table of FIG. 12.

The recording characteristics of the sample disk were evaluated using a medium/head evaluation system RH4160 made by Hitachi DECO. A PFPE lubricant was applied to each of the sample disks after sputtering the multiple layers. The surface of each of the sample disks was burnished, and projections and foreign objects were removed from the surface. Using a glide head, it was made sure in advance of using a magnetic write/read head that the media had no problem with regard to their head gliding characteristics. The magnetic head used had a perpendicular recording element with a main pole width of approximately 160 nm, and a GMR element for reading with an electrode spacing of approximately 140 nm and a shield gap length of approximately 55 nm. The flying height of the magnetic head was adjusted to approximately 8 nm by adjusting the disk rotation speed. For recording performance evaluation, a pseudo random recording pattern for testing was written on each of the media at a linear recording density of approximately 1 MBPI (megabits per inch), the written pattern was read, and the read error rate was measured. The results of the error rate measurement of the sample media using the above magnetic head made it known that the write/read conditions under which the error rate was minimum varied with the media. In the experiment, the recording performance was evaluated based on the error rates measured under write/read conditions which were optimized as much as possible. Namely, the write/read conditions applied to the error rate measurement varied with the media.

The ease of recording and erasing was also evaluated by writing a signal on each medium at a constant recording frequency of approximately 500 kFCI, writing the signal again on the same location of the same medium but at a recording frequency of approximately 125 kFCI, and measuring the read output reduction rate (overwrite value) for the signal written at approximately 500 kFCI. In evaluating the overwrite value, the write current of the magnetic head was set to approximately 50 mA complying with the maximum value of specifications. The error rates and overwrite values measured in the way described above are shown in the table of FIG. 12.

Figure 8:
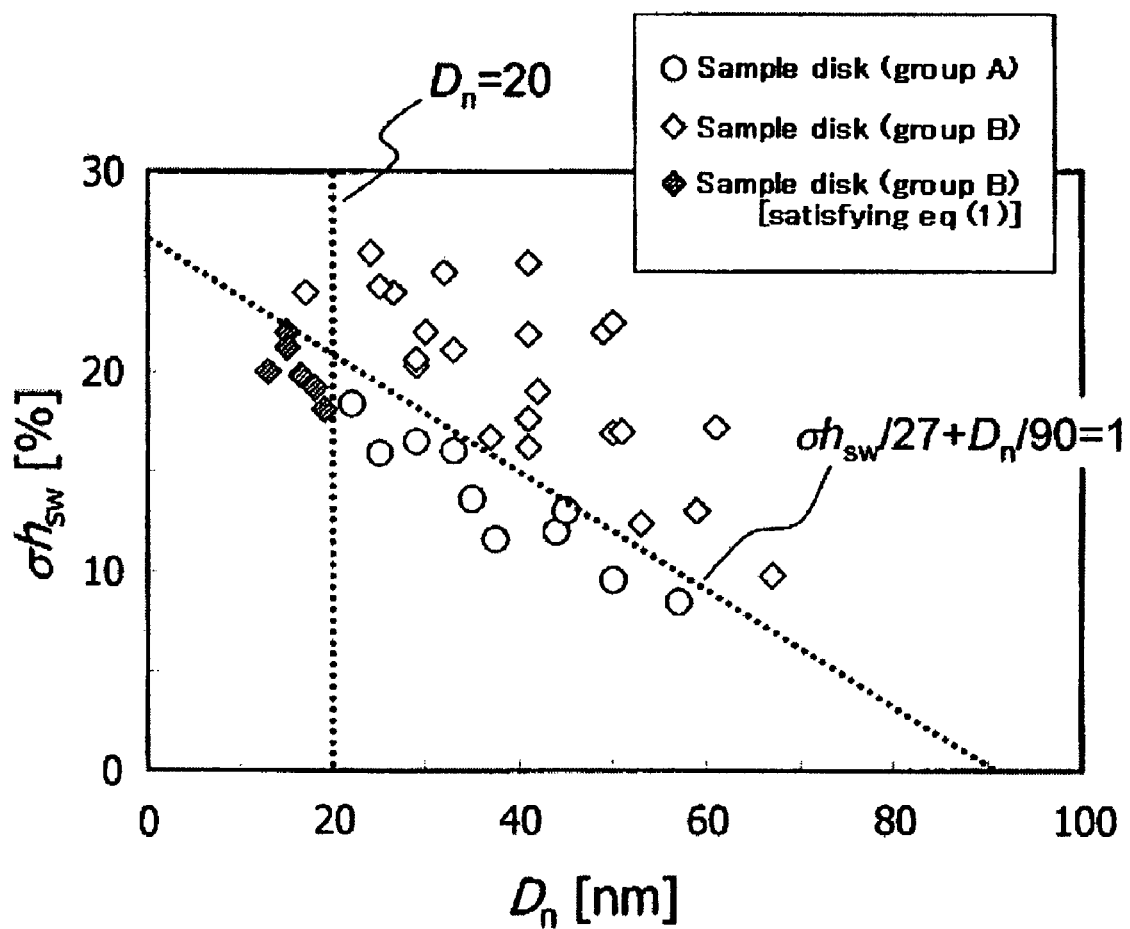
FIG. 8 is a diagram showing $\sigma h_{sw}$ and $D_n$ obtained from sample disks and plotted on a two-dimensional plane.

FIG. 8 shows two magnetostatic characteristic parameters plotted on a two-dimensional plane. The circles plotted in FIG. 8 correspond to the sample disk (group A). When the write/read characteristics of the sample disk (group A) were checked, all the sample disk exhibited a byte error rate of $10^{-4.3}$ or lower, qualifying them as usable recording media. None of the sample disk (group B) represented by the rhombuses in FIG. 8 exhibited a byte error rate (BER) lower than $10^{-2.2}$. Generally, an information recording system has a mechanism which corrects errors occurring during write and read processes using an error correction code. In a situation where the error rate exceeds $10^{-4}$, however, the amount of additional code required for error correction becomes much too large and, as a result, the substantive recording density remarkably decreases. Hence, based on the recording density used in the experiment, the media of group A are considered usable as recording media whereas the media of group B are considered not usable.

As shown in FIG. 8, all the sample disk (group A) satisfy the foregoing equations (1) and (2), whereas those of group B do not. It is therefore known that perpendicular magnetic recording media suitable for high-density recording were obtained by satisfying the conditions represented by the equations (1) and (2).

Figure 9:
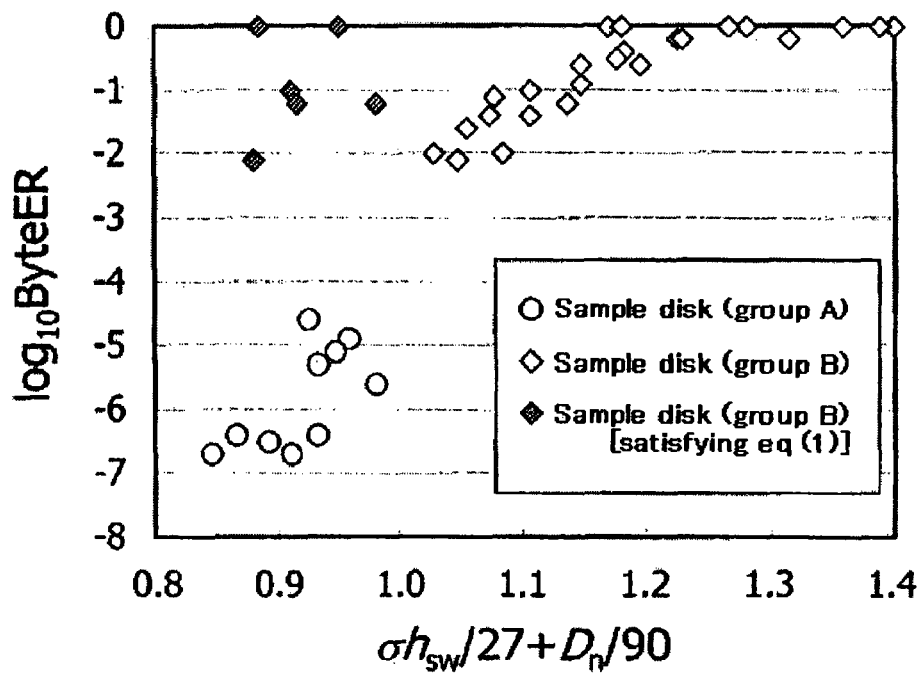
FIG. 9 is a diagram showing a relationship, on sample disks, between "$\sigma h_{sw}/27 + D_n/90$" and error rates at a linear recording density of 1 MBPI.

FIG. 9 shows the relationship between the parameter ($\sigma h_{sw}/27+D_n/90$) that is represented by the left-hand side of the equation (1) based on the measurements on the sample disks and that is laid out along the horizontal axis and the error rate measurements. In FIG. 9, data points on the sample disk (group A) are represented by circles, and those on the sample disk (group B) are represented by rhombuses. With the sample disk (group A) satisfying the equation (1), their parameter values laid out along the horizontal axis are all smaller than 1, and their error rates are low. Some (represented by hatched rhombuses) of the sample disk (group B) also satisfy the equation (1), but their error rates are not low.

Figure 10:
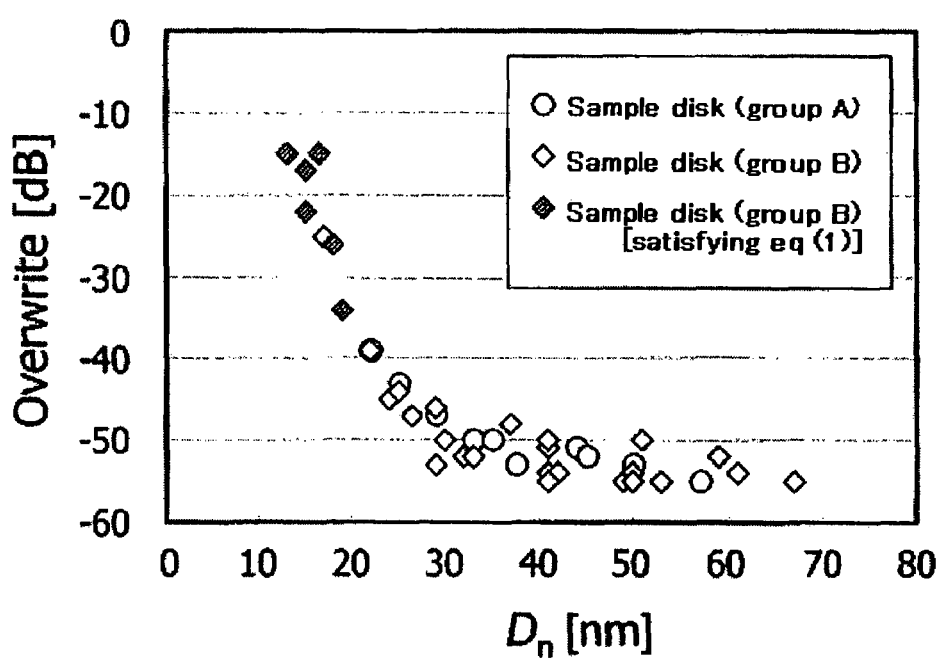
FIG. 10 is a diagram showing a relationship between $D_n$ values and overwrite values measured on sample disks.

FIG. 10 shows a relationship between $D_n$ values and overwrite values measured on the sample disk. As described in the foregoing, the overwrite values are values measured at a maximum magnetic field generated by the head. It is considered that writing and erasing data on and from the media that show large overwrite values are difficult. Considering that the overwrite values of the sample disk (group A) were −39 dB or lower, it is assumed that, when media show an overwrite value of −39 dB or lower, they can perform properly as recording media, allowing data to be written on normally. As shown in FIG. 10, sample disk which do not satisfy the equation (2) with $D_n$ values being 20 nm or lower show overwrite values sharply higher than those of the other sample disk. In FIG. 10, like in FIG. 9, the hatched rhombuses represent the data points of those sample disks, out of the sample disk (group B), which satisfy the equation (1). The sample disk represented by the hatched rhombuses do not satisfy the equation (2) with their $D_n$ values being 20 nm or lower, and their overwrite values were −35 dB or higher. It is assumed that these sample disks showed lower recording performance than the sample disk (group A) because of a recording field shortage which made normal writing difficult.

As is known from the foregoing, perpendicular magnetic recording media which satisfy recording performance requirements and which allow data to be written on even with a limited magnitude of the recording field from a magnetic head were obtained by controlling the magnetic properties of the perpendicular magnetic layer 75 so as to satisfy both of the equations (1) and (2).

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A magnetic recording medium comprising a substrate and a perpendicular magnetic layer formed on the substrate, characterized in that, when:
    a magnetization curve A is measured through the following steps A1 to A4:
    A1 applying a magnetic field large enough to saturate magnetization of the perpendicular magnetic layer in the negative direction, A2 applying various magnetic fields H in the positive direction, A3 measuring magnetization M after removing the magnetic fields H, and A4 obtaining a magnetization curve A using the measured magnetization M as a function of the H;

a magnetization curve B is measured through the following steps B1 to B5,

B1 applying a magnetic field large enough to saturate magnetization of a perpendicular magnetic layer in the positive direction, B2 applying a magnetic field which makes remanent magnetization $-M_r/2$ in the negative direction, $M_r$ being an absolute value of remanent magnetization of the perpendicular magnetic layer, B3 applying various magnetic fields H in the positive direction, B4 measuring magnetization M after removing the magnetic fields H, and B5 obtaining a magnetization curve B using the measured magnetization M as a function of the H;

a demagnetization factor $N_d$ is obtained from the following equation, where $H_a$ is an external magnetic field applied at an intersection between the magnetization curve A and $M=-M_r/2$, and $H_b$ is an external magnetic field applied at an intersection between the magnetization curve B and M=0;

$$N_d = \frac{|H_a - H_b|}{M_r/2}$$

$\sigma h_{sw}$ is determined from the following equation, where $H_c$ and $\sigma H_{sw}$ are an average value and a standard deviation, respectively, of magnetization switching fields $H_{sw}$, a cumulative probability distribution function of the magnetization switching fields $H_{sw}$ being represented by a magnetization curve A' obtained by making shearing correction on the magnetization curve A using the demagnetization factor $N_d$; and $$\sigma h_{sw} = \sigma H_{sw}/H_c$$

$D_n$ is determined from the following equation, where $N_d$ is the demagnetization factor and $t_{mag}$ is a film thickness of the perpendicular magnetic layer;

$$D_n = \frac{t_{mag}\sqrt{1-N_d^2}}{N_d}$$

the $\sigma h_{sw}$ and the $D_n$ satisfy inequalities $\sigma h_{sw}/27 + D_n/90 < 1$, and $D_n > 20$.

2. The magnetic recording medium according to claim 1, characterized in that the perpendicular magnetic layer includes a cobalt-platinum-based alloy.

3. The magnetic recording medium according to claim 1, characterized in that the perpendicular magnetic layer is a granular magnetic layer having crystal grain boundaries made mainly of an oxide or a nitride.

4. The magnetic recording medium according to claim 1, characterized in that a soft-magnetic underlayer is provided between the substrate and the perpendicular magnetic layer.

5. A magnetic recording apparatus comprising a magnetic recording medium which includes a perpendicular magnetic layer formed on a substrate, a spindle motor which drives the magnetic recording medium, a magnetic head which performs write/read operation on the magnetic recording medium, and a head actuator which positions the magnetic head at a desired recording track location on the magnetic recording medium, characterized in that the magnetic recording medium is such that, when:

a magnetization curve A is measured through the following steps A1 to A4:

A1 applying a magnetic field large enough to saturate magnetization of the perpendicular magnetic layer in the negative direction, A2 applying various magnetic fields H in the positive direction, A3 measuring magnetization M after removing the magnetic fields H, and A4 obtaining a magnetization curve A using the measured magnetization M as a function of the H;

a magnetization curve B is measured through the following steps B1 to B5,

B1 applying a magnetic field large enough to saturate magnetization of a perpendicular magnetic layer in the positive direction, B2 applying a magnetic field which makes remanent magnetization $-M_r/2$ in the negative direction, $M_r$ being an absolute value of remanent magnetization of the perpendicular magnetic layer, B3 applying various magnetic fields H in the positive direction, B4 measuring magnetization M after removing the magnetic fields H, and B5 obtaining a magnetization curve B using the measured magnetization M as a function of the H;

a demagnetization factor $N_d$ is obtained from the following equation, where $H_a$ is an external magnetic field applied at an intersection between the magnetization curve A and $M=-M_r/2$, and $H_b$ is an external magnetic field applied at an intersection between the magnetization curve B and M=0;

$$N_d = \frac{|H_a - H_b|}{M_r/2}$$

$\sigma h_{sw}$ is determined from the following equation, where $H_c$ and $\sigma H_{sw}$ are an average value and a standard deviation, respectively, of magnetization switching fields $H_{sw}$, a cumulative probability distribution function of the magnetization switching fields $H_{sw}$ being represented by a magnetization curve A' obtained by making shearing correction on the magnetization curve A using the demagnetization factor $N_d$; and $$\sigma h_{sw} = \sigma H_{sw}/H_c$$

$D_n$ is determined from the following equation, where $N_d$ is the demagnetization factor and $t_{mag}$ [nm] is a film thickness of the perpendicular magnetic layer;

$$D_n = \frac{t_{mag}\sqrt{1-N_d^2}}{N_d}$$

the $\sigma h_{sw}$ and the $D_n$ satisfy inequalities $\sigma h_{sw}/27 + D_n/90 < 1$, and $D_n > 20$.

6. A method of evaluating a magnetic recording medium including a magnetic recording layer, the method comprising:

measuring a magnetization curve A through the following steps A1 to A4:

A1 applying a magnetic field large enough to saturate magnetization of the perpendicular magnetic layer in the negative direction, A2 applying various magnetic fields H in the positive direction, A3 measuring magnetization M after removing the magnetic fields H, and A4 obtaining a magnetization curve A using the measured magnetization M as a function of the H;

measuring a magnetization curve B through the following steps B1 to B5,

B1 applying a magnetic field large enough to saturate magnetization of a perpendicular magnetic layer in the positive direction, B2 applying a magnetic field which makes remanent magnetization $-M_r/2$ in the negative direction, $M_r$ being an absolute value of remanent magnetization of the perpendicular magnetic layer, B3 applying various magnetic fields H in the positive direction, B4 measuring magnetization M after removing the magnetic fields H, and B5 obtaining a magnetization curve B using the measured magnetization M as a function of the H;

obtaining a demagnetization factor $N_d$ from the following equation, where $H_a$ is an external magnetic field applied at an intersection between the magnetization curve A and $M=-M_r/2$, and $H_b$ is an external magnetic field applied at an intersection between the magnetization curve B and $M=0$;

$$N_d = \frac{|H_a - H_b|}{M_r/2}$$

determining $\sigma h_{sw}$ from the following equation, where $H_c$ and $\sigma H_{sw}$ are an average value and a standard deviation, respectively, of magnetization switching fields $H_{sw}$, a cumulative probability distribution function of the magnetization switching fields $H_{sw}$ being represented by a magnetization curve A' obtained by making shearing correction on the magnetization curve A using the demagnetization factor $N_d$;

$\sigma h_{sw} = \sigma H_{sw}/H_c$ determining $D_n$ from the following equation, where $N_d$ is the demagnetization factor and $t_{mag}$ [nm] is a film thickness of the perpendicular magnetic layer; and $$D_n = \frac{t_{mag}\sqrt{1-N_d^2}}{N_d}$$

determining whether or not the $\sigma h_{sw}$ and the $D_n$ satisfy inequalities $\sigma h_{sw}/27 + D_n/90 < 1$, and $D_n > 20$.

* * * * *